(12) United States Patent
Nathan et al.

(10) Patent No.: US 7,510,241 B2
(45) Date of Patent: Mar. 31, 2009

(54) POP-UP DISPLAY

(75) Inventors: John F. Nathan, Highland Township, MI (US); Sam Hanlon, Livonia, MI (US)

(73) Assignee: Lear Corporation, Southfield, MI (US)

( * ) Notice: Subject to any disclaimer, the term of this patent is extended or adjusted under 35 U.S.C. 154(b) by 210 days.

(21) Appl. No.: 11/425,225

(22) Filed: Jun. 20, 2006

(65) Prior Publication Data

US 2007/0290536 A1 Dec. 20, 2007

(51) Int. Cl.
*A47C 31/00* (2006.01)

(52) U.S. Cl. ............ 297/217.3; 297/217.1; 297/188.04; 297/188.05; 297/188.21; 248/284.1; 345/87; 345/905

(58) Field of Classification Search .............. 297/217.1, 297/217.3, 463.1, 188.01, 188.04, 188.05, 297/188.21; 248/284.1, 286.1; 345/87, 905
See application file for complete search history.

(56) References Cited

U.S. PATENT DOCUMENTS

| | | | | |
|---|---|---|---|---|
| 5,847,685 A | * | 12/1998 | Otsuki | 345/87 |
| 6,007,036 A | * | 12/1999 | Rosen | 248/286.1 |
| 6,011,685 A | * | 1/2000 | Otsuki | 361/679 |
| 6,250,967 B1 | * | 6/2001 | Chu | 439/668 |
| 6,570,628 B1 | * | 5/2003 | Hirano | 349/11 |
| 7,040,699 B2 | * | 5/2006 | Curran et al. | 297/217.3 |
| 7,261,266 B2 | * | 8/2007 | Satterfield | 248/284.1 |
| 2003/0127880 A1 | | 7/2003 | Nonaka et al. | |
| 2004/0099766 A1 | | 5/2004 | Pratt, Jr. | |
| 2004/0160096 A1 | | 8/2004 | Boudinot | |
| 2004/0212745 A1 | | 10/2004 | Chang | |
| 2004/0227372 A1 | | 11/2004 | Lavelle et al. | |
| 2005/0023086 A1 | * | 2/2005 | Szilagyi | 188/67 |
| 2005/0098593 A1 | | 5/2005 | Schedivy | |
| 2005/0140191 A1 | | 6/2005 | Curran et al. | |
| 2005/0231008 A1 | | 10/2005 | Jaaska, Sr. | |
| 2006/0050018 A1 | * | 3/2006 | Hutzel et al. | 345/60 |
| 2007/0188004 A1 | * | 8/2007 | Browne et al. | 297/391 |
| 2007/0246285 A1 | * | 10/2007 | Browne et al. | 180/273 |
| 2007/0246979 A1 | * | 10/2007 | Browne et al. | 297/216.12 |

FOREIGN PATENT DOCUMENTS

DE 4128663 C2 10/2002
DE 202004000292 U1 4/2004

* cited by examiner

*Primary Examiner*—Laurie K Cranmer
(74) *Attorney, Agent, or Firm*—Brooks Kushman P.C.

(57) ABSTRACT

A pop-up display suitable for use in a seat back of an occupant seat, such as but not limited to those employed within vehicles to carry vehicle occupants. The display being configured to pop-up from the seat back in response to mechanical and/or electrical stimulation. The mechanical actuation optionally being localized relative to the display such that the occupant may be required to be in reach of the display in order to impart the mechanical stimulation. The electrical actuation optionally being imparted with electrical signals communicated thereto by a switch or vehicle controller such that the display may be ejected without being in reach of the same.

15 Claims, 3 Drawing Sheets

POP-UP DISPLAY

BACKGROUND OF THE INVENTION

1. Field of the Invention

The present invention relates to pop-up display, such as but not limited to electronic displays of the type that pop-up out of a vehicle seat back.

2. Background Art

More and more vehicles are including electronic displays to facilitate showing movies and other forms of in-vehicle entertainment. The displays are commonly connected to DVD players or other entertainment units and mounted at fixed positions on the vehicle, such as on dashboards, seat backs, and other fixed objects. The fixed mounting of the displays requires the displays to be mounted in visible positions such that the displays are exposed at all times.

The exposed display can be susceptible to breakage, contamination, and other damage to that may be detrimental to long term viability and use. The exposed displays may also provide relatively hard surfaces that can injury or otherwise inflict pain to passengers during an accident or other situation in which the passengers may be thrust into forceful contact with the display.

SUMMARY OF THE INVENTION

One non-limiting aspect of the present invention relates to a display that may be hidden or otherwise protected from constant exposure.

One non-limiting aspect of the present invention relates to a display that may be loaded into a protected or secured position so as to limit contact damages during accidents.

One non-limiting aspect of the present invention relates to a display that may be ejected from a loaded position within a seat back in response to mechanical and/or electrical stimulation.

One non-limiting aspect of the present invention relates to a display that may be ejected from a seat back for viewing with local and/or remote actuations, such as but not limited to locally applied mechanical stimulations and remotely induced electrical stimulations.

One non-limiting aspect of the present invention relates a vehicle seat having an pop-up electronic display. The vehicle seat may include a seat back, a display, a locking mechanism, and a combination electrical and mechanical lock actuating mechanism. The seat back may include a cavity at an upper portion thereof with a topside opening. The display ejection mechanism may be configured to automatically eject the display from a loaded position within the cavity through the topside of the seat back to an unloaded position so as to facilitate viewing of the display. The locking mechanism may include locked and unlocked states. The locked state may correspond with restraining the ejection mechanism from automatically ejecting the display from the seat back and the unlocked state may correspond with allowing the ejection mechanism to automatically eject the display from the seat back. The combination electrical and mechanical lock actuating mechanism may be configured for unlocking the locking mechanism in response to electrical and mechanical stimulants. The unlocking may correspond with transitioning the lock actuation mechanism from the locked to the unlocked state.

One non-limiting aspect of the present invention relates vehicle seat having an pop-up electronic display. The vehicle seat may include a display ejection mechanism, a locking mechanism, and a combination electrical and mechanical lock actuating mechanism. The display ejection mechanism may be configured to automatically eject the display from a loaded position within the seat back to an unloaded position so as to facilitate viewing of the display. The locking mechanism may include locked and unlocked states. The locked state may correspond with restraining the ejection mechanism from automatically ejecting the display from the seat and the unlocked state may correspond with allowing the ejection mechanism to automatically eject the display from the seat. The combination electrical and mechanical lock actuating mechanism may be configured for unlocking the locking mechanism in response to electrical and mechanical stimulants. The unlocking may correspond with transitioning the lock actuation mechanism from the locked to the unlocked state.

One non-limiting aspect of the present invention relates to a key to key-hole lock wherein the key is retracted from the key-hole to unlock the lock. The lock may include a cam and a shape memory alloy (SMA) element. The cam may be configured to engage teeth on the key in such a manner that actuation of the cam cause the key to retract from the key-hole. The cam may be mechanically actuated through a push button lever so as to facilitate unlocking the lock in response to a mechanical stimulant. The SMA element may be configured to contract with electrical heating, the SMA element being connected to the key such that heating of the SMA element retracts the key from the key-hole in response to an electrical stimulant.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
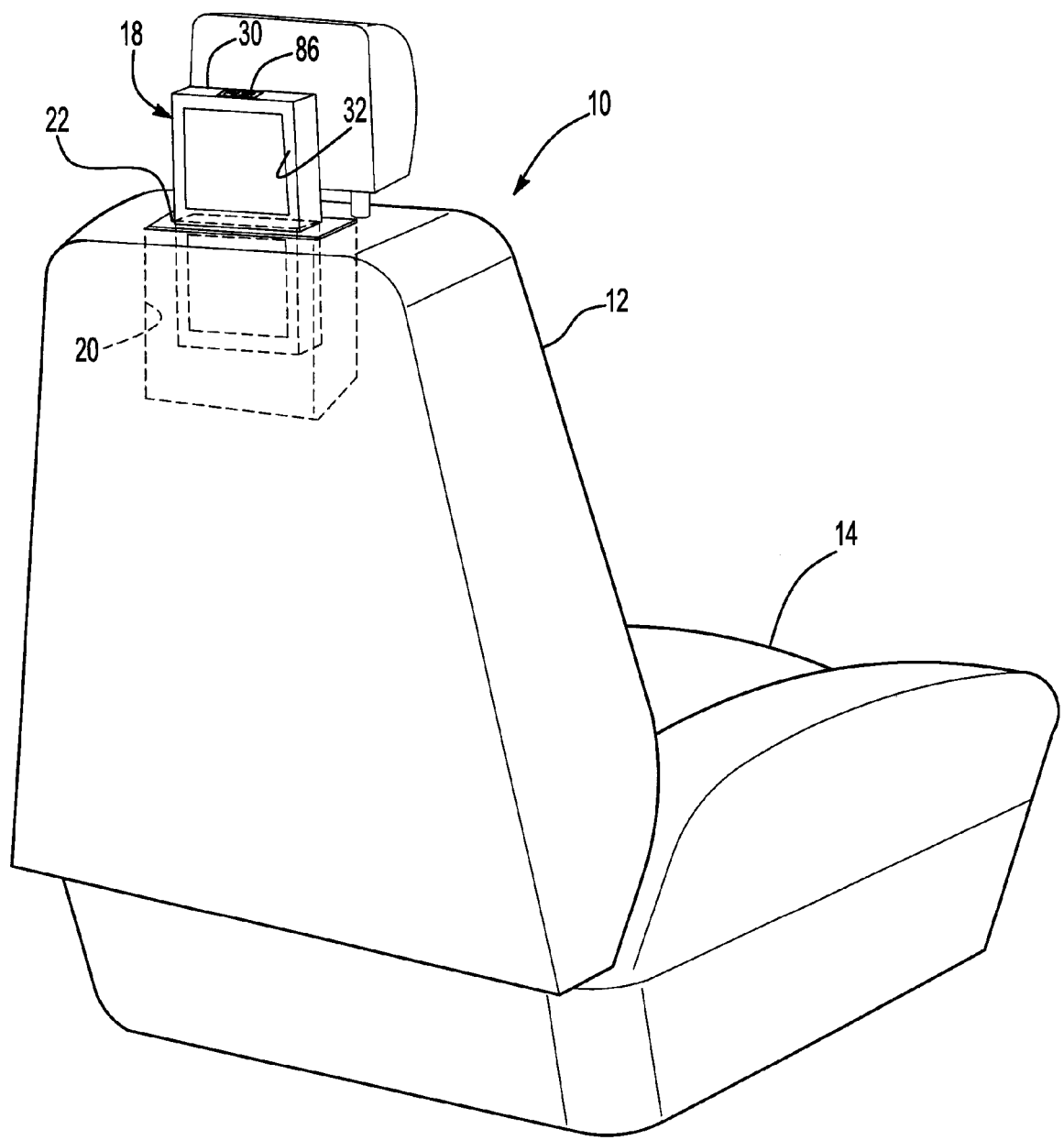
FIG. 1 schematically illustrates a seat in accordance with one non-limiting aspect of the present invention.

FIG. 1 schematically illustrates a seat 10 in accordance with one non-limiting aspect of the present invention. The seat 10 may optionally include a seat back 12 and seat bottom 14 for supporting an occupant. For exemplary purposes, the seat 10 may be a vehicle seat of the type commonly used in vehicles to support passengers. The present invention, however, is not intended to be limited to vehicle seats and fully contemplates its application to any number of seating environments beside automotive vehicles.

The seat 10 may include a pop-up electronic display 18 having capabilities to electronically display images to vehicle passengers. The display 18 may include or be connected to a DVD player, entertainment system, or other feature (not shown) suitable for generating displayable images. The display 18 may include a cathode ray tube (CRT) screen, plasma screen, liquid crystal screen, or any other type of screen having suitable capabilities for displaying images.

Optionally, the display 18 may include other features, such as but not limited to a speaker(s), key pad, touch screen, compression actuated button(s), processor, memory, etc. The present invention contemplates any number of configurations, features, and capabilities for the display and is not intended to be limited to the foregoing.

The seat back 12 may include a cavity 20 for receiving the display 18. The cavity 20 may include an opening 22 at a topside 24 of the seat back 12 to facilitate egress of the display 18 from within an inner portion of the seat back 12. The cavity 20 may be suitably sized and shaped to facilitate receiving any number of displays having any number of configurations and sizes. Optionally, the seat back 12 may include cables, wireless features, and other elements and devices to facilitate connecting electrical equipment, entertainment systems, and other items to the display 18.

The cavity 20 may be positioned within the interior of the seat back 12 and behind foam, padding, and other cushioning so as to protect the display 18 from contact and other incidents that may crack or otherwise damage the screen. Optionally, a protective, rigid or semi-rigid, material may be embedded within the seat back 12 between the display 18 and the outer portion of the seat back 12 as to provide further protection against incidental contact with the screen.

As shown in phantom, the display 18 is moveable between a loaded position and an unloaded position. The loaded position may correspond with the display being positioned within the cavity 20 such that it is substantially concealed by the seat back 12. This position may correspond with a top portion 30 of an outer housing 32 of the displaying 18 optionally being flush with the topside 24 of the seat back 12. As described below in more detail, the flush positioning of the display 18 in this manner may be beneficial in facilitating ejection of the same. Optionally, the display 18 may not be mounted flush with the topside 24 of the seat 12 and instead positioned below the surface thereof.

The unloaded position may corresponding with the display 18 being ejected through the topside opening 22 of the cavity 20 such that a portion of the screen is visible from the outside of the seat back 12. The unloaded position may be sufficient to facilitate viewing of the display 18 and/or a portion of the screen by a vehicle occupant located behind the seat back 12 or at some other location sufficient to permit the viewing of the same. Optionally, the display 18 may include features (not shown) to facilitate swiveling, rotating, tilting, or otherwise positioning the unloaded display 18 for better viewing angles.

Figure 2:
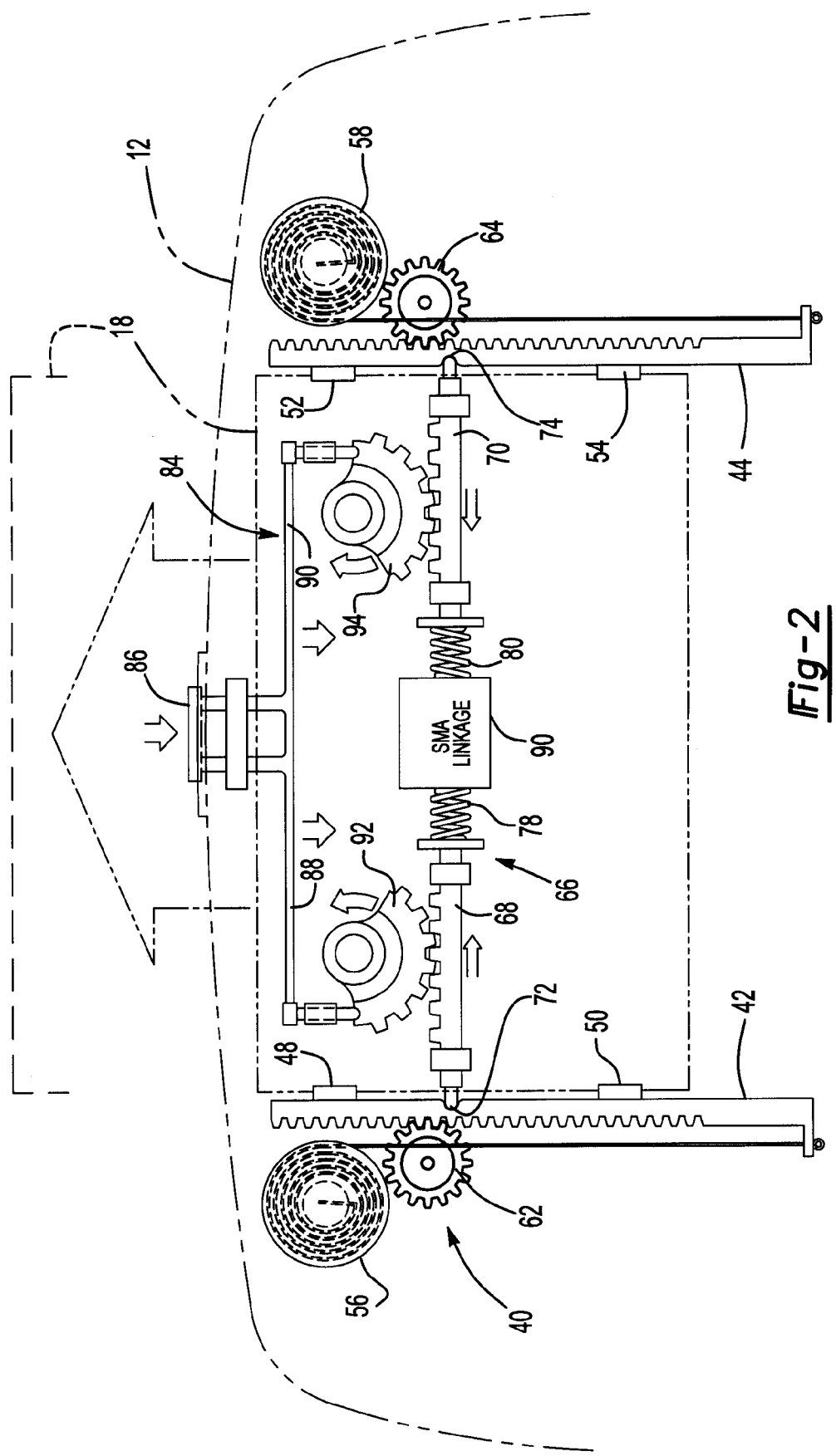
FIG. 2 illustrates a rear-side view of display ejection mechanism in accordance with one non-limiting aspect of the present invention.

FIG. 2 illustrates a rear-side view of a display ejection mechanism 40 in accordance with one non-limiting aspect of the present invention. The ejection mechanism 40 may used in conjunction with the seat 10 shown in FIG. 1 to facilitate the egress and ingress of the display 18 between the loaded and unloaded position described above. Of course, however, the present invention is not so limited and fully contemplates the ejection mechanism 40 being used to facilitate display movements in any number of environments.

The mechanism 40 may include a pair of vertically aligned tracks 42-44 to facilitate the vertical movements associated with positioning the display 18 between the loaded and unloaded positions. The tracks 42-44 may include fastener 48-54 clips or other attachment features to facilitate fastening to the display 18 such that the display 18 is positioned in front of the tracks 42-44 to cover their appearance when in the unloaded position. Optionally, the housing 32 may surround or otherwise conceal the tracks 42-44. Rotary torsion springs 56-58 may be bias the tracks 42-44 in an upward direction to facilitate ejecting the display from the loaded to the unloaded position when unrestrained.

In this manner, the ejection mechanism 40 may be configured to facilitate automatically expelling the display 18 from the seat back 12 for viewing by vehicle occupants. Optionally, rotary dampening members 62-64 may engage teeth on the tracks 42-44 such that the dampening members 62-64 rotate with movement of the tracks 42-44 in such a manner as to control or otherwise dampen the movement of the same, which can be helpful in limiting wear and tear on the display 18.

The illustrated track and torsion spring arrangement, however, is only one exemplary configuration for the ejection mechanism 40 and the present invention is not intended to be so limited. The present invention fully contemplates the use of any number of features and arrangements to facilitate automatically ejecting the display 18 from the seat back 12, such as but not limited to hydraulic or motor actuated systems, which may or may not include tracks or other display guides.

A locking mechanism 66 having locked and unlocked states may be include to facilitate restraining or otherwise preventing ejection of the display 18. The locking mechanism 66 may include a first and second key 68-70 for cooperating with corresponding first and second key-holes 72-74. The keys 68-70 may operate with the key-holes 72-74 to restrain movement of the ejection mechanism 4. In more detail, the keys 68-70 may be retracted from and inserted within the key-holes 72-74 to respectively permit (unlock) and prevent (lock) vertical movement of the tracks 42-44.

Optionally, springs 78-80 may be included to bias the keys 68-70 into the key-holes 72-74 such that the keys 68-70 are automatically loaded within the key-holes 72-74 when the display 18 is in the loaded position and other forces are removed therefrom. The spring biasing of the keys 68-70 can be helpful in automatically locking the display 18 at the loaded position after a user or other element reloads the display from the unloaded to loaded position such that the keys 68-70 align with the key-holes 72-74, including but not limited to a user pressing downwardly on the unloaded display 18 or automatic operations occurring upon vehicle shut-off.

A combination electrical and mechanical lock actuating mechanism 84 may be included to actuate the locking mechanism 66 between the locked and unlocked states. The lock actuating mechanism 84 may be configured to transition between locking states in response to electrical and mechanical stimulants. The illustrated locking mechanism 84 is shown to include both electrical and mechanical stimulant capabilities, however, the present invention is not so limited and fully contemplates the use of only one of the electrical or mechanical stimulants, and the features associated with the operation of the same.

The ability to actuate the locking mechanism 84 in response to electrical and mechanical stimulation allows the present invention to provide mechanical and/or electrical ejection of the display 18. The mechanically actuated ejection can be advantageous for use with a back row seating occupants manually ejecting the display 18 by simply reaching forward and apply a mechanical stimulant. The electrically actuated ejection can be advantageous in allowing a driver or other remotely located passenger or vehicle operating system to eject the display 18 through an electrical switch or other signal generation feature.

A push-button lever 86 may be included to facilitate mechanically stimulating ejection of the display 18. The push-button lever 86 may be located on a topside of the display 18 such that it mounts flush or close to the topside 24 of the seat back 12 when the display 18 is in the loaded position. The push-button lever 84 may include arms 88-90 that extend from the topside of the display 18 to cams 92-94 of a cam arrangement.

The cams 92-94 may include teeth that engage teeth on the keys 68-70. The cams 92-94 may be rotary mounted and engaged with teeth on the keys 68-70 such that downward pressure on the push-button lever 84 causes each arm 88-90 to simultaneously retract a corresponding key 68-70 from the corresponding key-hole 72-74. Once the keys 68-70 are retracted, the rotary torsion springs 56-58 are free to eject the display 18 from the loaded to the unloaded position, with optional dampening provided by the rotary dampening members 62-64.

A shape memory allow (SMA) element 90 or other electrically operable or stimulated element may be included to facilitate electrically stimulating ejection of the display 18. The SMA element 80 may be attached to the keys 68-70 and configured to retract the keys 68-70 from the corresponding key-holes 72-74 in response to receipt of electrical signals. The SMA element 90 may be connected to the keys 68-70 in such a manner that expansion or contraction of the SMA element 90 may be sufficient to retract the keys 68-70 from the key-holes 72-74.

The SMA element 90 may be of the type that expands and/or contracts with electrical stimulation, thermal stimulation, and the like, as one having ordinary skill in the art will appreciate. The springs 78-80 may apply force to reset the cams 92-94, and thereby, the push-button lever 86 after mechanical stimulation and to reset the SMA element 90 after electrical stimulation such that the SMA element may be reset without waiting for the cooling thereof.

The locking mechanism 66, lock actuating mechanism 84, and element associated therewith may be mounted to or otherwise supported on the display 18, or within the housing 20, such that they travel with the display 18 and are expelled therewith. Likewise, some or all of the features may be separately mounted to the seat back 12 such that they remain within the seat back 12, optionally in a stationary position, when the display 18 is ejected.

Figure 3:
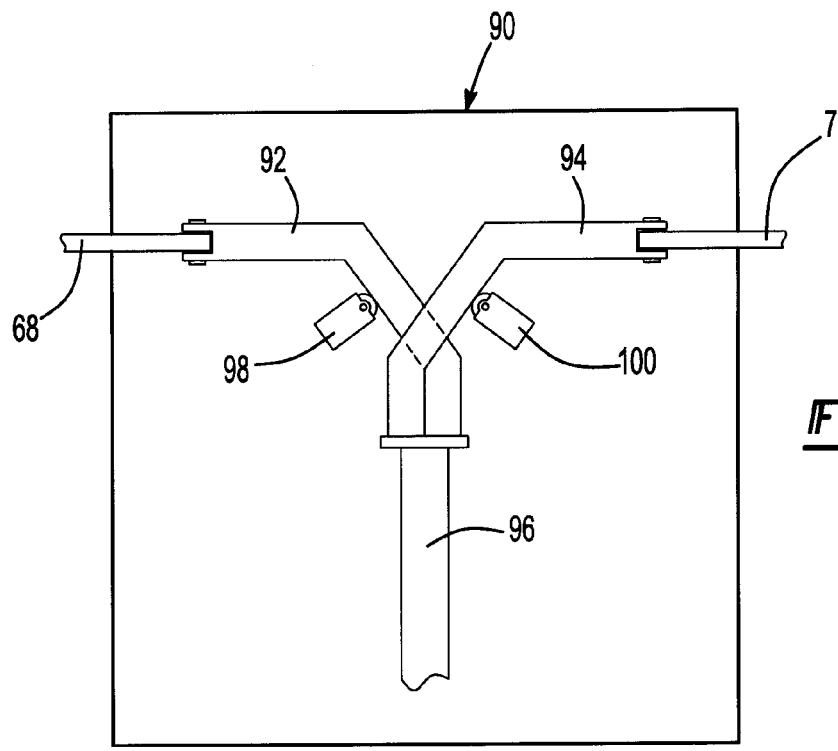
FIG. 3 illustrates one exemplary configuration of a SMA element in accordance with one non-limiting aspect of the present invention.

FIG. 3 illustrates one exemplary configuration of the SMA element 90 in accordance with one non-limiting aspect of the present invention. The SMA element 90 is shown to include a wish-bone arrangement where plastic, cable, or other rigid or semi-rigid connectors 92-94 connected each key 68-70. The connectors 92-94 may be retracted in a downward direction with excitation of an SMA portion 96 such that angled portions of the connectors 92-94 travel along stops 98-100 in such a manner as to simultaneously retract each key 68-70 from the corresponding key-holes 72-74.

Figure 4:
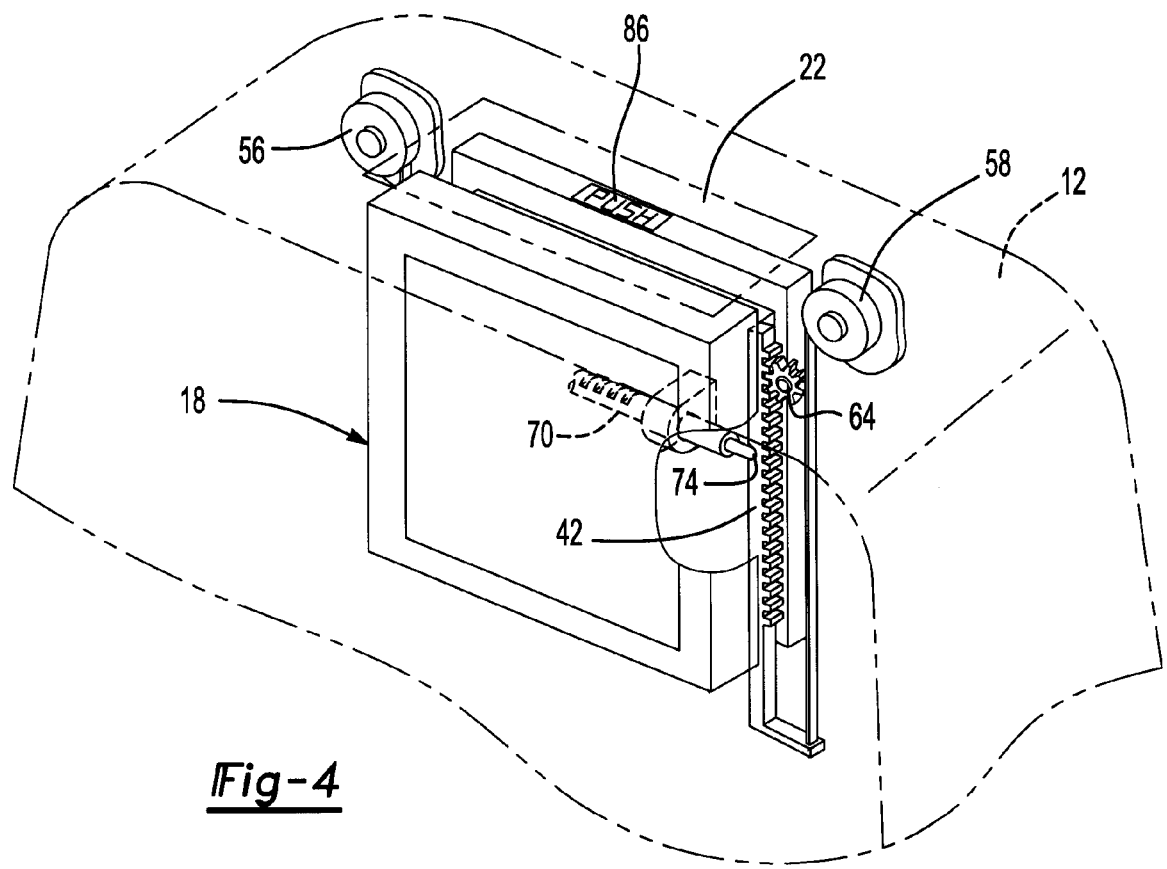
FIG. 4 illustrates a more detailed perspective view of the seat back and display in accordance with one non-limiting aspect of the present invention.

FIG. 4 illustrates a more detailed perspective view of the seat back 12 and display 18 in accordance with one non-limiting aspect of the present invention. As shown, the top portion of the display 18 may be substantially coplanar with the topside of the seat back 12. The tracks 42-44 may be substantially vertically orientated to facilitate ejecting the display 18 and include the key-holes 72-74 for receiving the keys 68-70 and restraining movement of the display 18.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat having an pop-up electronic display, the vehicle seat comprising:
   a seat back having a cavity at an upper portion;
   a display ejection mechanism configured to automatically eject the display from a loaded position within the cavity through the topside of the seat back to an unloaded position so as to facilitate viewing of the display;
   a locking mechanism having locked and unlocked states, the locked state corresponding with restraining the ejection mechanism from automatically ejecting the display from the seat back and the unlocked state corresponding with allowing the ejection mechanism to automatically eject the display from the seat back;
   a combination electrical and mechanical lock actuating mechanism configured for unlocking the locking mechanism in response to electrical and mechanical stimulants, the unlocking corresponding with transitioning the lock actuation mechanism from the locked to the unlocked state;
   wherein the lock actuating mechanism includes a push-button lever configured to facilitate unlocking the locking mechanism with a mechanical stimulant; and
   wherein the push-button lever is connected to a cam arrangement configured to retract a key of the locking mechanism from a key-hole in the ejection mechanism so as to permit the ejection mechanism to eject the display.

2. The seat of claim 1 wherein the push-button lever is located at the topside of the seat back when the display is loaded within the cavity.

3. The seat of claim 1 wherein the cam arrangement includes a cam configured to engage teeth on the key in such a manner that mechanical actuation of the cam causes the cam to retract the key from the key-hole.

4. The seat of claim 3 wherein the locking mechanism includes a second key for cooperating with a second key-hole in the ejection mechanism and wherein the cam arrangement includes a second cam such that both cams are configured to simultaneously retract both keys from the corresponding key-holes.

5. The seat of claim 1 wherein the ejection mechanism includes a spring to bias the display from the loaded to unloaded position such that unlocking of the locking mechanism allows the spring to eject the display from the seat back.

6. A vehicle seat having an pop-up electronic display, the vehicle seat comprising:
   a seat back having a cavity at an upper portion;
   a display ejection mechanism configured to automatically eject the display from a loaded position within the cavity through the topside of the seat back to an unloaded position so as to facilitate viewing of the display;

a locking mechanism having locked and unlocked states, the locked state corresponding with restraining the ejection mechanism from automatically ejecting the display from the seat back and the unlocked state corresponding with allowing the ejection mechanism to automatically eject the display from the seat back;

a combination electrical and mechanical lock actuating mechanism configured for unlocking the locking mechanism in response to electrical and mechanical stimulants, the unlocking corresponding with transitioning the lock actuation mechanism from the locked to the unlocked state;

wherein the lock actuating mechanism includes a push-button lever configured to facilitate unlocking the locking mechanism with a mechanical stimulant; and wherein the locking mechanism includes a shape memory alloy (SMA) element configured to facilitate unlocking the locking mechanism in response to an electrical stimulant;

wherein the SMA element is configured to retract a key of the locking mechanism from a key-hole in the ejection mechanism so as to permit the ejection mechanism to eject the display; and wherein the locking mechanism includes a cam arrangement having a cam configured to engage teeth on the key in such a manner that mechanical actuation of the cam causes the cam to retract the key from the key-hole, and thereby permit unlocking of the locking mechanism in response to a mechanical stimulant.

7. The seat of claim 6 wherein a spring is operable with the cam and SMA element to facilitate locking the key and resetting the cam and SMA element such that the cam is reset after mechanical stimulation and the SMA element is reset without having to wait for the cooling thereof.

8. The seat of claim 6 wherein the locking mechanism includes a second key for cooperating with a second key-hole in the ejection mechanism and wherein the SMA element is configured to simultaneously retract both keys from the corresponding key-holes.

9. The seat of claim 8 wherein an end of the keys are connected to the SMA element in a wish-bone configuration such that actuation of the SMA element in a single direction simultaneously retracts both keys.

10. A vehicle seat having an pop-up electronic display, the vehicle seat comprising:
    a seat back having a cavity at an upper portion thereof with a topside opening;
    a display ejection mechanism configured to automatically eject the display from a loaded position within the cavity through the topside of the seat back to an unloaded position so as to facilitate viewing of the display;
    a locking mechanism having locked and unlocked states, the locked state corresponding with restraining the ejection mechanism from automatically ejecting the display from the seat back and the unlocked state corresponding with allowing the ejection mechanism to automatically eject the display from the seat back;
    a combination electrical and mechanical lock actuating mechanism configured for unlocking the locking mechanism in response to electrical and mechanical stimulants, the unlocking corresponding with transitioning the lock actuation mechanism from the locked to the unlocked state; and
    wherein the ejection mechanism includes a rotary dampening element to dampen ejection of the display from the seat back.

11. The seat of claim 10 wherein the rotary dampening element is configured to engage teeth on a track of the ejection mechanism used to facilitate egress of the display such that rotary dampening member rotates with movement of the track to dampen ejection of the display.

12. A vehicle seat having an pop-up electronic display, the vehicle seat comprising:
    a display ejection mechanism configured to automatically eject the display from a loaded position to an unloaded position;
    a locking mechanism having locked and unlocked states, the locked state corresponding with restraining the ejection mechanism from automatically ejecting the display and the unlocked state corresponding with allowing the ejection mechanism to automatically eject the display;
    a lock actuating mechanism configured for unlocking the locking mechanism, the unlocking corresponding with transitioning the locking mechanism from the locked to the unlocked state;
    wherein the lock actuating mechanism includes a mechanical, non-electrically driven portion that uses force applied to a push-button lever attached to the seat to transition the locking mechanism from the locked to the unlocked state;
    wherein the lock actuating mechanism includes a non-motorized, electrically driven portion that uses electrical current applied to a shape memory alloy (SMA) element to transition the locking mechanism from the locked to the unlocked state; and
    wherein the push-button lever applies force to a moveable arm used to transition the locking mechanism from the locked to the unlocked state, and wherein the SMA element is configured to apply force to the moveable arm in a manner that is independent of the push-button lever and sufficient to transition the locking mechanism from the locked to the unlocked state in the absence of the force provided by the push-button.

13. The seat of claim 12 wherein the display ejection mechanism includes a rotary dampening element to dampen ejection of the display.

14. A key to key-hole lock wherein the key is retracted from the key-hole to unlock the lock, the lock comprising
    a cam configured to engage teeth on the key in such a manner that actuation of the cam cause the key to retract from the key-hole, the cam being mechanically actuated through a push button lever so as to facilitate unlocking the lock in response to a mechanical stimulant;
    a shape memory alloy (SMA) element configured to contract with electrical heating, the SMA element being connected to the key such that heating of the SMA element retracts the key from the key-hole in response to an electrical stimulant.

15. The lock of claim 14 further comprising a spring operable with the cam and the SMA element to facilitate resetting the key in the key-hole such that the cam is reset after mechanical stimulation and the SMA element is reset without having wait for the cooling thereof.

* * * * *